(No Model.)
H. P. & C. N. LENHART.
COMBINED SHOVEL AND TONGS.
No. 577,108.  Patented Feb. 16, 1897.
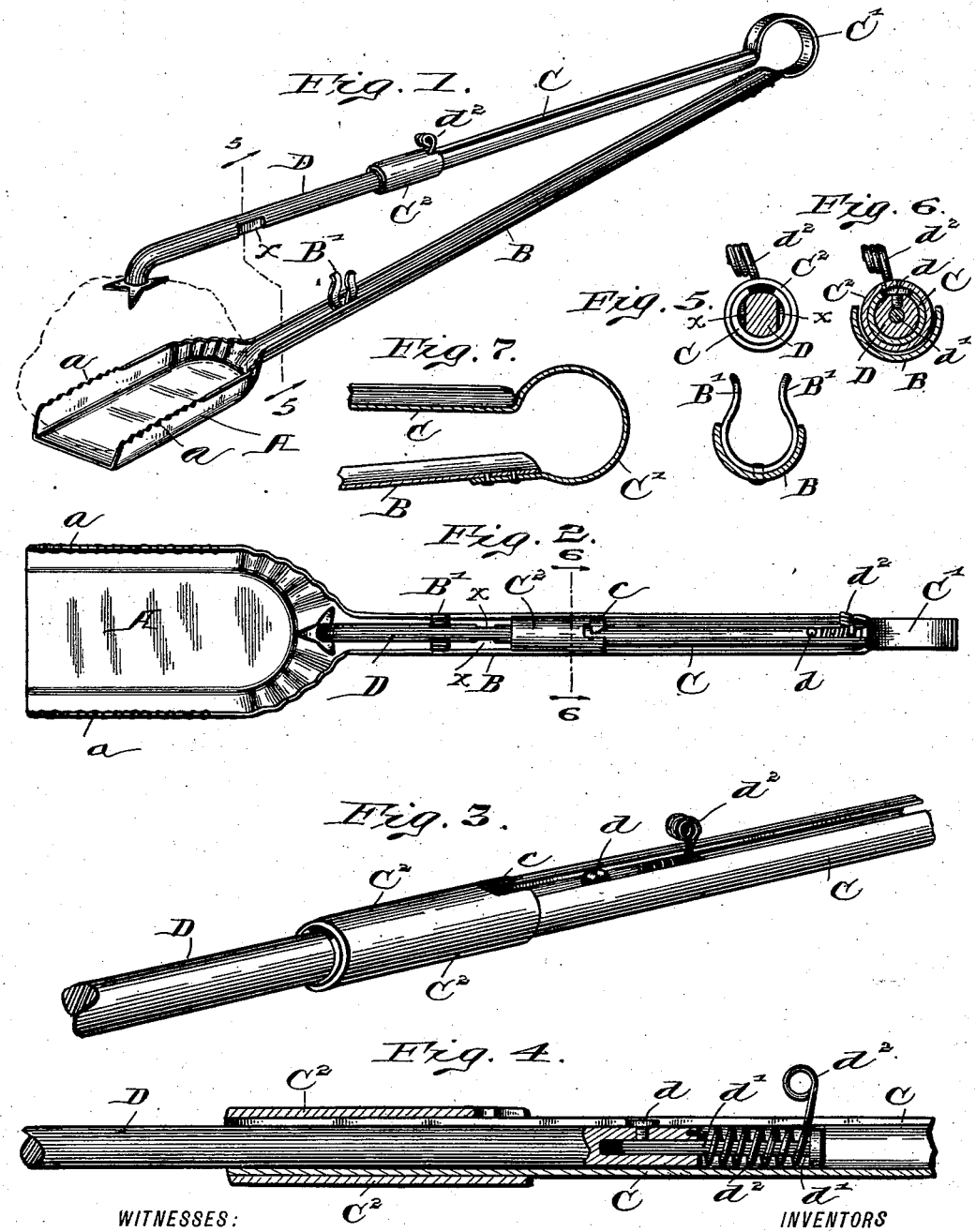
WITNESSES:
INVENTORS
Harry P. Lenhart
and Charles N. Lenhart,
BY
Chester Bradford,
ATTORNEY.

UNITED STATES PATENT OFFICE.

HARRY P. LENHART, OF TERRE HAUTE, INDIANA, AND CHARLES N. LENHART, OF MATTOON, ILLINOIS.

COMBINED SHOVEL AND TONGS.

SPECIFICATION forming part of Letters Patent No. 577,108, dated February 16, 1897.

Application filed June 20, 1896. Serial No. 596,237. (No model.)

*To all whom it may concern:*

Be it known that we, HARRY P. LENHART, of Terre Haute, Vigo county, Indiana, and CHARLES N. LENHART, of Mattoon, Coles county, Illinois, citizens of the United States, have invented certain new and useful Improvements in a Combined Shovel and Tongs, of which the following is a specification.

The object of our said invention is to embody in a fire-shovel a construction which will enable the same utensil to be used also as a pair of tongs, thus saving not only a portion of the expense incident to the production of two separate articles, but also obviating some of the inconveniences attendant upon the use of separate articles, or, in other words, securing in a single utensil the convenience of having them both always at hand and ready to be used indifferently.

Referring to the accompanying drawings, which are made a part hereof, and on which similar letters of reference indicate similar parts, Figure 1 is a perspective view of a utensil embodying our said invention with the tongs-leg extended and ready for use, so that said utensil is in condition as a pair of tongs; Fig. 2, a plan view of the utensil with the tongs-leg withdrawn into the position it occupies when said utensil is being used or is ready to be used as a shovel alone; Fig. 3, a perspective view, on an enlarged scale, of a portion of the tongs-leg structure; Fig. 4, a longitudinal sectional view of the same; Fig. 5, a transverse sectional view of the parts in the position shown in Fig. 1 as seen from the dotted line 5 5; Fig. 6, a transverse sectional view as seen from the dotted line 6 6 in Fig. 2, and Fig. 7 a detail longitudinal sectional view of fragments of the handle portions and the loop-spring by which they are united.

In said drawings the portions marked A represent the shovel-blade, B and C the two portions of the handle of the implement, and D the extensible portion of the second tongs-leg, the shovel and the handle portions being of course other portions of the tongs-legs when the utensil is in the tongs form.

The shovel-blade A is of the usual or any desired form, except that the edges of the side flanges, as at $a$, are toothed or serrated for the purpose of enabling the utensil to take a firmer grip on the piece of coal or other article when said utensil is used as a pair of tongs.

The handle portion B is semitubular in form, and may be either formed in piece with the shovel-blade A or formed separately and riveted onto said shovel-blade, as may be desired. By preference we form this handle portion integrally with the shovel-blade, as shown. Within this handle portion, near the lower end, we secure a catch B' for the tongs-leg, said catch being preferably in the form of a clip-spring, for purposes which will be presently stated.

The handle portion C is for the greater portion of its length of a tubular form, except that a slot is left throughout its length to receive the guide-stud $d$ on the tongs-leg. The two handle portions are connected by a loop-spring C', which we preferably form integrally with the handle portion C and rivet to the handle portion B, although, of course, said spring may be formed separately and riveted to both handle portions, if desired. Upon the lower end of the handle portion C is a ferrule $C^2$, which covers the slot in the handle portion proper for the distance of the length of said ferrule. At that point in the upper end of said ferrule immediately over said slot we form the latch $c$, with which a spring-catch on the upper end of the movable tongs-leg portion will engage, and whereby said tongs-leg is held in extended position.

The extensible tongs-leg portion D is in the form, preferably, of a round rod and fits within the upper or handle portion C. Its projecting end is armed with a suitable grasping point or points to enable it to act efficiently as a tongs member. We have shown a triangular point, but manifestly a single sharpened point will be efficient, and said point may be of any form to suit the manufacturer or user. At or near the upper end this rod has a guide-stud $d$, which rests in the slot in the handle portion C, and by this means the rotation of said rod or extensible portion relatively to said handle portion is prevented. The extreme upper end of this tongs-rod is preferably reduced in size, as at $d'$, and a spring $d^2$ coiled about the reduced portion, with an end projecting out through the slot to the outside and there turned into shape to form a handle or thumb-piece, the whole forming a spring-catch. The projecting portion of this spring-catch is so positioned that normally it is held toward that side of the slot from which the latch $c$ on the ferrule $C^2$ projects, but, of course, will yield under the application of any force and move toward the other side of the slot. The spring-catch and the latch are so arranged and proportioned relatively to each other that when the extensible rod or tongs portion D is projected downwardly with some force the spring-catch will first come in contact with the inclined upper side of the latch and be thus forced over, and will then pass around and hook under said latch, with the result that the tongs-leg will be held into its projected or extended position. The guide-stud $d$, as above stated, prevents said rod D from rotating, and thus the spring-catch and latch are held into engagement.

As above stated, the handle portion B is semitubular in form. It is also somewhat larger in diameter than the handle portion C, so that when the two parts are brought together the handle portion C is partially inclosed within or "nests" into the handle portion B. As also above stated, the handle portion B is provided near the lower end with a catch B' for the tongs-rod D, which catch is preferably in the form of a clip-spring, of appropriate size, so that when the tongs member D is forced toward the handle part B the sides of said catch will spring over it, and thus hold it to that position. The utensil can therefore be closed up from the tongs to the shovel position by simply retracting the tongs-rod and forcing the members together.

For convenience in opening the device from the shovel to the tongs position the tongs-rod is flattened slightly on its sides at a point just above where the clip-spring B' embraces said rod when the same is in the closed or shovel position, as shown at $x$ in Figs. 1, 2, and 5.

The utensil is used in the following manner: Assuming it to be the shovel position, as shown in Fig. 2, and that it is desired to use it as a pair of tongs, the user first pushes the tongs-rod D down a short distance, by means of a combined spring and thumb-piece $d^2$, until said tongs-rod is slid through the spring B' to a point where the flat sides $x$ register therewith, when said tongs-rod will immediately fly upward, actuated by the loop-spring C', by which the two handle parts are united. The movement of the tongs-rod is continued, either by pushing or a slight jerk, until the spring-catch $d^2$ engages with the latch $c$, and the rod D is thus held in the extended position, ready for use, as shown in Fig. 1.

In restoring the utensil to the shovel position the spring-catch $d^2$ is pushed sidewise until it will pass the latch $c$, when the tongs-leg portion D is withdrawn to the position shown in Fig. 2, and then the parts are forced together by pressing, so that the tongs-leg snaps inside the clip-spring B' and all lie closely together, as will be readily understood.

Having thus fully described our said invention, what we claim as new, and desire to secure by Letters Patent, is—

1. The combination of a shovel having a two-part handle, and an extensible rod connected to one member of said handle and adapted to serve as a tongs-leg, the shovel-blade being upon the other member of said handle.

2. The combination of a shovel the handle whereof is semitubular in form, a second handle portion yieldingly connected thereto at the upper end and adapted to serve as a tongs portion when the two handle portions are separated, but adapted to rest in the concave portion of the shovel-handle when closed, substantially as set forth.

3. The combination of a shovel, a shovel-handle having a clip-spring thereon, a second yieldingly-connected handle portion, a tongs-leg telescopically mounted in said second handle portion and adapted when the two handle portions are forced together to be caught and held by said clip-spring, substantially as set forth.

4. In a combined shovel and tongs, a telescopic tongs-leg composed of a substantially tubular structure having a slot, a rod therein provided with a guide-stud entering said slot, whereby the telescopic movement is permitted but rotary movement between the two parts prevented, substantially as set forth.

5. In a combined shovel and tongs, a telescopic tongs-leg composed of a substantially tubular member, and a rod mounted within said member, a ferrule on the lower end of the tubular member, a latch on the upper end of said ferrule, and a combined spring-catch and thumb-push whereby the rod member of the leg may be operated, said tube member of the leg being provided with a slot through which said combined spring-catch and thumb-push may pass, substantially as shown and described.

6. In a combined shovel and tongs, a tongs-leg composed of a substantially tubular part having a slot, a rod within said part having a guide-stud entering said slot, a ferrule surrounding the lower end of the tubular part and having a latch registering with said slot, said rod portion being also provided with a combined spring-catch and thumb-push or handle adapted to engage with said latch, substantially as set forth.

7. The combination of a shovel, a semitubular handle thereto provided with a clip-spring, a second handle portion united to the first by means of a loop-spring and substantially tubular in form, a tongs-leg inserted within said tubular handle portion and there held by suitable devices, the whole being arranged as described, whereby it may be used either as a shovel or as a pair of tongs at will, and readily shifted from one condition to the other, substantially as set forth.

In witness whereof we have hereunto set our hands and seals, at Mattoon, Illinois, this 15th day of June, A. D. 1896.

HARRY P. LENHART. [L. S.]
CHARLES N. LENHART. [L. S.]

Witnesses:
WILLIAM B. SHEPPARD,
FRED W. BECKER.